Feb. 13, 1968   C. A. GLENN   3,368,446
CLINCHING NAIL
Filed Jan. 21, 1966

INVENTOR.
CHARLES A. GLENN
BY *Fishman + Van Kirk*

ATTORNEYS.

3,368,446
CLINCHING NAIL
Charles A. Glenn, 92 Four Mile Road,
West Hartford, Conn. 06107
Filed Jan. 21, 1966, Ser. No. 522,181
1 Claim. (Cl. 85—84)

ABSTRACT OF THE DISCLOSURE

A clinching nail having a tubular outer shell with a pin member disposed therein, the pin member having a portion of increased diameter at one end which tapers to a work penetrating end. The pin member also has a recess therein which defines a shoulder and the tubular outer member has a plurality of extensions which are folded on themselves to form deformable tabs, the folded over portion of the tabs being disposed in the recess in the pin member with their ends adjacent the shoulder whereby movement of the pin member relative to the tubular member causes outward deformation of the tabs.

---

This invention relates to fasteners of the type which may be employed to hold two pieces of material together by means of being driven through the first such piece of material and into the second. More particularly, this invention is directed to a nail having portions thereon which may be caused to engage a material into which the nail has been driven in such a manner as to prevent withdrawal of the nail from such material through application of normal forces. Accordingly, the general objects of this invention are to provide apparatus of such character.

Fasteners which may be deformed subsequent to insertion in a material so as to tend to prevent removal thereof, either intentionally or through shrinkage of the material, have long been known. However, these prior art devices, and especially those generally referred to as clinching nails, have met with little commercial success. This lack of success may be attributed to the fact that special tools were needed to cause the devices to perform in their intended manner. Typically, the prior art clinching nail comprised a deformable hollow shell surrounding a center pin. To produce deformation of the shell and thereby cause the clinching action, it was necessary to employ a special tool to pull the center pin in the opposite direction to that which the nail had been driven. Other similar devices have been proposed and, in some cases, tried. However, in none of these other prior art clinching nails are the outer shell and center pin initially flush to form the head of the nail. Accordingly, driving these prior art nails was difficult, special tools often being needed, and waste was high since distortion of either element during the driving process prevented proper functioning of the nail.

This invention overcomes the disadvantages of the prior art by providing a clinching nail which may be easily driven without the use of special tools and which may be caused to engage the work at the sides of the bore formed by the nail by means of a conventional and readily available instrument.

It is therefore an object of this invention to provide a novel nail.

It is another object of this invention to provide a clinching nail.

It is a further object of this invention to provide a nail having deformable portions thereon which may be driven without the use of special tools.

It is also an object of this invention to provide a clinching nail wherein the major elements thereof are initially substantially flush with one another at the nail head.

It is still another object of this invention to provide a clinching nail the deformable portions of which may be caused to engage the material into which the nail has been driven by driving a portion of the nail further into the work.

It is yet another object of this invention to provide a clinching nail the deformable portions of which may be caused to engage the material into which the nail has been driven through the use of a center punch.

These and other objects of this invention are accomplished by a nail comprised of an inner member having the point theron and a tubular outer shell which surrounds said inner member. The inner member and outer shell are flush at the head of the nail thereby preventing distortion of either element during driving of the nail from rendering the nail unusable. The inner member is provided with at least a first recess and the outer shell has at least a first tab thereon which is at least partly positioned in the recess. The end of the recess in the inner member forms a shoulder which, upon an engagement with the tab, will cause the tab to be distorted outwardly so as to engage the material into which the nail has been driven. Such engagement may be effected by striking the inner member at the head of the nail with a center punch thus driving the inner member further into the material and simultaneously causing the desired distortion of the tab or tabs.

This invention may be better understood and its numerous advantages will become apparent to those skilled in the art by reference to the accompanying drawing wherein like reference numerals refer to like elements in both figures and in which.

Figure 1:
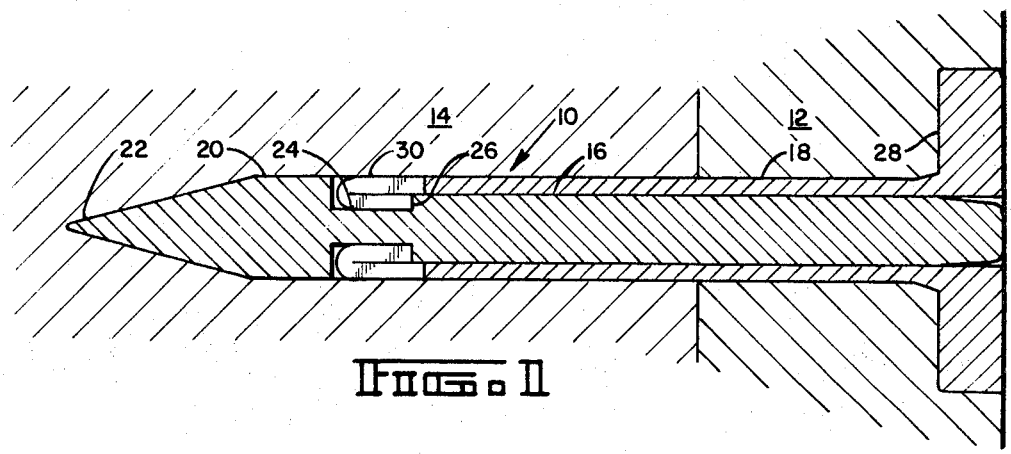
FIGURE 1 is a cross-sectional view of a first embodiment of this invention wherein the nail has been driven such that its head is flush with the surface of the work.

Referring now to FIGURE 1, a first embodiment of a novel clinching nail of this invention is indicated generally at 10. Nail 10 is shown as having been driven through a first piece of material 12 into a second piece of material 14 thereby joining pieces 12 and 14 together. Nail 10 is comprised of an inner member 16, which usually will be in the form of a solid pin, and an outer member 18, which is in the form of a tubular section or shell partially surrounding member 16.

The inner member or pin 16 is initially flush with the head of the nail, as shown in FIGURE 1, both before and after the nail has been driven into the work. The first or head end of pin 16 may, if desired, have an identation therein so as to facilitate placing of a punch in the manner and for the purpose to be described below. Pin 16, at the end of the nail opposite to the head, terminates in a body 20 of increased cross-sectional area. Body 20 defines the tip of the nail and usually has a portion of constant cross-sectional area and a conical or wedge-shaped portion 22 which tapers to a point. It is to be understood that pin 16 and body 20 may be machined from the same stock or, as in the usual instance, body portion 20 may be formed from a separate piece of material and attached to pin 16 by swaging or other suitable method. The maximum cross-sectional area, or diameter in the case of the usual circular cross-section, of body 20 is approximately equal to the outer diameter of shell 18. Thus, between the inner termination of portion 22 and the head, the nail generally presents a substantially uniform cross-sectional area to the material into which it is being driven. Pin 16 is machined or otherwise formed to provide a recess 24 therein adjacent to body 20. Recess 24, which may comprise a series of grooves or a reduced diameter portion or portions which extend either partially or completely around member 16, terminates in a shoulder 26 at the upper end thereof. Recess 24 is thus defined by body 20 and shoulder 26.

A flange 28 is formed, by a suitable method such as swaging, on the first or head end of shell 18. Flange 28, in cooperation with the first end of pin 16, forms the head of the nail. It will thus be observed that the outer surface of flange 28 and the end of pin 16 are initially flush. At the end oppositely disposed from flange 28, shell 18 has one or more tabs 30 extending therefrom. Tabs 30 may be formed from extensions of shell 18 which are folded inwardly on themselves in such a manner that the folded portion fits into recess 24 with the end of the tab adjacent to shoulder 26. Alternatively, the tabs may be comprised of portions of shell 18 having an increased wall thickness, the manufacturing step of folding thus being eliminated. In either case, operation of the nail may be facilitated by causing shoulder 26 to assume the configuration of a tapered wedging surface.

When employed, the nail comprising this invention is driven into the pieces to be joined as shown in FIGURE 1 by conventional driving means such as a hammer. Since the end of pin 16 and the striking surface of flange 28 are initially flush, there are no unsupported portions of the nail. Accordingly, during the initial driving of the nail, the outer shell 18 will not crimp or buckle since it is supported internally by pin 16 and similarly any bending of pin 16 will be accompanied by similar bending of pin 18 and, unless extreme, such bending will not prevent the clinching action to be described below.

Figure 2:
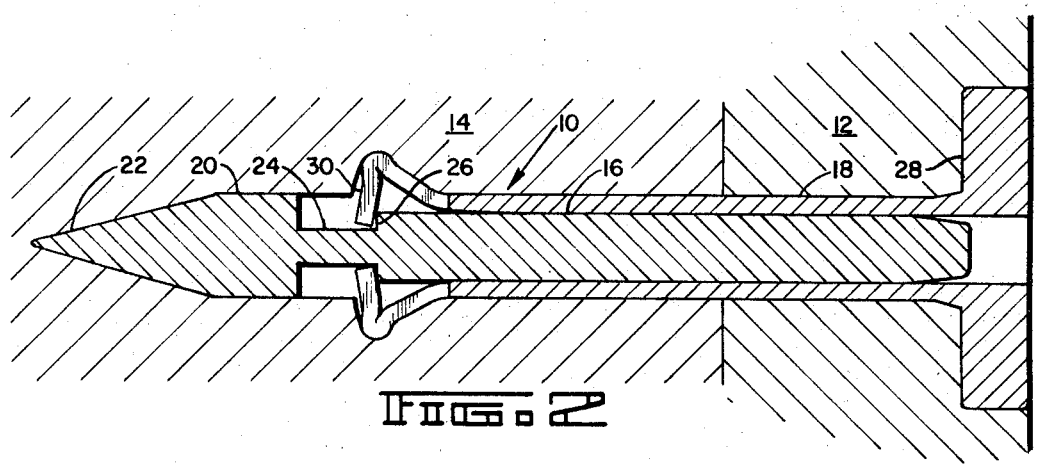
FIGURE 2 is a cross-sectional view of the nail of FIGURE 1 after the clinching action has been effected.

Referring now to FIGURE 2, after the nail has been initially driven to depth desired, a conventional center punch is placed against the exposed (head) end of pin 16. Upon striking the punch with a hammer, the center pin is driven further into the work. Outer shell 18 is prevented from further inward movement by flange 28. The relative inward motion of pin 16 causes shoulder 26 to engage the end of the folded portions of tabs 30. Shoulder 26 thus forces the end of tabs 30 downwardly and, since the tab cannot move in the direction of the shoulder, causes the tabs to be distorted outwardly as shown in FIGURE 2. The outward movement of tabs 30 causes the initially unfolded portions thereof to engage the material thus producing a clinching action.

As it should now be obvious, a novel clinching nail has been invented which is particularly suited for end grain nailing and for use in situations, such as attaching plaster board panels to studs, where nail "popping" is a problem. As should also be obvious, while only two tabs 30 have been shown, any number of such tabs may be employed.

As a modification, the head end of pin 16 could be recessed within shell 18, and tabs 30 could initially contact the right end of body 20. In this case, the driving force would be delivered from flange 28 through shell 18 and tabs 30 to body 20. Tabs 30 would still function as previously described when pin 16 is struck with a center punch. The recessing of pin 16 will not result in any crimping buckling of shell 18 since shell 18 will still be supported along substantially its full length by pin 16, or shell 18 could be dimensioned to support the full driving force without crimping or buckling.

While a preferred embodiment has been shown and described, various modifications and substitutions may be made without departing from the spirit and scope of this invention. Accordingly, it is to be understood that this invention has been described by way of illustration and not limitation.

What is claimed is:

1. A fastener for joining pieces of material comprising:

an inner member, said inner member comprising a solid pin having a recessed portion which defines a shoulder and a first portion of substantial constant cross-sectional area extending from said shoulder to a first end of said inner member, said inner member further having a second portion of initially larger cross-sectional area than said first portion, at least part of said second portion tapering to a material piercing end;

a tubular shell of substantially constant diameter at least partly surrounding said first portion of said inner member, one end of said shell extending at least to said first end of said first portion of said inner member;

a flange extending outwardly from said one end of said shell, said flange cooperating with said first end of said first portion of said inner member to form a substantially flat striking surface;

at least one deformable member extending longitudinally from said other end of said tubular shell, said deformable member being folded inwardly on itself, the folded over portion of said deformable member being intially disposed in said recess in said inner member with its end adjacent to said shoulder whereby said fastener may be driven into material by striking said substantially flat striking surface and said deformable member may thereafter be caused to engage the material into which it has been driven by driving said inner member further into the material thereby causing said shoulder to engage the end of said folded portion of said deformable member and thus to cause outward distortion of said deformable member.

References Cited
UNITED STATES PATENTS

| 917,907 | 4/1909 | Taylor | 85—85 |
| 1,569,115 | 1/1926 | Brandt | 85—23 |
| 1,944,513 | 1/1934 | Johnson | 85—84 |
| 2,994,243 | 8/1961 | Langstroth | 85—84 |
| 3,116,528 | 1/1964 | Poe | 85—84 |

MARION PARSONS, JR., *Primary Examiner.*